(12) United States Patent
Barmichev et al.

(10) Patent No.: US 9,738,372 B2
(45) Date of Patent: Aug. 22, 2017

(54) LOW PROFILE CARGO HANDLING SYSTEM

(71) Applicant: The Boeing Company, Chicago, IL (US)

(72) Inventors: Sergey D. Barmichev, Kirkland, WA (US); Harry Wilbert Slusher, Fountain Valley, CA (US); Gary Peter Seagrave, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 127 days.

(21) Appl. No.: 14/594,120

(22) Filed: Jan. 10, 2015

(65) Prior Publication Data

US 2015/0125254 A1    May 7, 2015

Related U.S. Application Data

(62) Division of application No. 14/029,791, filed on Sep. 17, 2013, now Pat. No. 8,939,402, which is a division of application No. 12/905,581, filed on Oct. 15, 2010, now Pat. No. 8,561,946.

(51) Int. Cl.
  *B64C 1/20* (2006.01)
  *B64D 9/00* (2006.01)

(52) U.S. Cl.
  CPC .............. *B64C 1/20* (2013.01); *B64D 9/00* (2013.01); *B64D 2009/006* (2013.01); *Y10T 29/49716* (2015.01)

(58) Field of Classification Search
  CPC ........ B64C 1/20; B64C 9/00; B64C 2009/006
  See application file for complete search history.

(56) References Cited

U.S. PATENT DOCUMENTS

| 3,381,921 | A | * | 5/1968 | McDonough ......... B64D 9/003 105/370 |
| 3,899,092 | A | | 8/1975 | Nordstrom |
| 4,077,590 | A | | 3/1978 | Shorey |
| 4,544,319 | A | | 10/1985 | Folling et al. |
| 4,824,050 | A | | 4/1989 | Courter |
| 5,383,630 | A | | 1/1995 | Flatten |
| 6,039,288 | A | | 3/2000 | Huber et al. |

(Continued)

FOREIGN PATENT DOCUMENTS

| DE | 19627846 A1 | 1/1998 |
| EP | 0263540 A1 | 4/1988 |
| WO | WO2008157075 A1 | 12/2008 |

OTHER PUBLICATIONS

Office Action, dated Feb. 15, 2013, regarding U.S. Appl. No. 12/905,581, 12 pages.

(Continued)

*Primary Examiner* — Nicholas McFall
(74) *Attorney, Agent, or Firm* — Yee & Associates, P.C.

(57) ABSTRACT

Different advantageous embodiments provide a method and apparatus to increase a clearance of a cargo area of an aircraft. The apparatus and method may comprise an aircraft with a cargo area. A tray system may have a plurality of segment trays with each segment tray positioned between a plurality of floor beams located underneath a surface of the floor of the cargo area. A plurality of rollers in the tray system may be configured to allow an object to be moved across the cargo area.

21 Claims, 10 Drawing Sheets

(56) References Cited

U.S. PATENT DOCUMENTS

| | | |
|---|---|---|
| 6,193,043 B1 | 2/2001 | Langston et al. |
| 7,073,651 B2 | 7/2006 | Costanzo et al. |
| 7,785,056 B2 * | 8/2010 | Sanford .................. B64D 9/00 414/392 |
| 8,226,034 B2 | 7/2012 | Huber et al. |
| 8,561,946 B2 | 10/2013 | Barmichev et al. |
| 8,939,402 B2 | 1/2015 | Barmichev et al. |
| 2004/0245397 A1 | 12/2004 | Garcia et al. |
| 2005/0023105 A1 | 2/2005 | Costanzo et al. |
| 2007/0176048 A1 | 8/2007 | Huber et al. |
| 2009/0304482 A1 | 12/2009 | Sanford et al. |
| 2010/0038206 A1 | 2/2010 | Kulesha |
| 2012/0091273 A1 | 4/2012 | Barmichev et al. |
| 2014/0017058 A1 | 1/2014 | Barmichev et al. |

OTHER PUBLICATIONS

Notice of Allowance, dated Jun. 17, 2013, regarding U.S. Appl. No. 12/905,581, 8 pages.
Extended European Search Report dated May 4, 2017, regarding Application No. 1183672.2, 8 pages.

* cited by examiner

LOW PROFILE CARGO HANDLING SYSTEM

This Application is a divisional of U.S. patent application Ser. No. 14/029,791, filed Sep. 17, 2013, status allowed, which is a divisional of application U.S. patent application Ser. No. 12/905,581, filed Oct. 15, 2010, issued as U.S. Pat. No. 8,561,946. The contacts of both applications are incorporated herein by reference in their entirety.

BACKGROUND INFORMATION

1. Field

The present disclosure relates generally to a cargo handling system and, in particular, to a low profile cargo conveyance system. Still more particularly, the present disclosure relates to a method and apparatus for allowing the loading of taller cargo into a cargo area on an aircraft and increasing the cargo area volume compared to current cargo conveyance systems.

2. Background

Aircraft have different spaces and areas. Some of the areas may be cargo areas, for carrying cargo. Cargo areas may be on the main deck or on the lower deck of the aircraft. While an aircraft is on the ground, the cargo area may be unloaded and loaded. Existing cargo conveyance systems used in aircraft may be installed on top of the floor of the cargo area. The roller systems may be mounted on axles, in a track channel, or tray, that rests on the floor of the compartment. The upper surface of the rollers, where the cargo will contact, may extend 2" to 3" above the cargo floor. Since the cargo area may have a fixed height, the height of the cargo to be loaded may be restricted and the overall useable volume of the cargo compartment may be reduced.

Current cargo conveyance systems may incorporate several roller trays in a cargo compartment. The roller trays may be oriented along the longitudinal axis of the aircraft. In addition, transverse trays with balls may be present in a cargo doorway area. The balls may be metal and freely rotating. Freely rotating may be defined as rotating in any direction and around any axis. Existing commercial cargo handling systems allow the loading of standard or non-standard cargo containers, palletized cargo, or special equipment.

Existing cargo conveyance systems may limit the height of the cargo to that of existing aircraft cargo containers. Some applications, such as fuselage mounted auxiliary fuel tanks, may be loaded or unloaded during maintenance. These fuselage mounted auxiliary fuel tanks may increase the amount of fuel that can be carried, but are limited in volume by the restrictions imposed by existing cargo conveyance systems. Increasing the amount of fuel carried may be used to increase the range of an aircraft or increase the amount of fuel that can be offloaded by a tanker aircraft.

Therefore, it would be advantageous to have a method and apparatus that takes into account one or more of the issues discussed above, as well as possibly other issues.

SUMMARY

In one advantageous embodiment, an apparatus may comprise an aircraft with a cargo area. A tray system may have a plurality of segment trays with each segment tray positioned between a plurality of floor beams located underneath a surface of the cargo area. A plurality of rollers in the tray system may be configured to allow an object to be moved across the cargo area.

In another advantageous embodiment, an apparatus may comprise an aircraft with a cargo area. The apparatus may also comprise a tray system having a plurality of segment trays with each segment tray positioned between a plurality of floor beams located underneath a surface of the cargo area. A first side of the tray system may be substantially flush with a surface of a floor in the cargo area. A portion of the tray system may extend into an area of a door of the cargo area. The plurality of segment trays may have interlocking pads configured to interlock the plurality of segment trays which are adjacent. The interlocking pads may be anti-symmetrical. At least one of the plurality of segment trays may be a short roller tray positioned near a door of the cargo area. The apparatus may also comprise a plurality of rollers in the tray system configured to allow an object to be moved across the cargo area. The object may be selected from a group comprising cargo, a pallet, and liquid cargo tank. The plurality of rollers may be partially above the plurality of floor beams, a first portion of the plurality of rollers may be located in an area of a door to the cargo area and rotate around any axis, and a second portion of the plurality of rollers may rotate around a longitudinal axis of the aircraft. The apparatus may comprise a plurality of slots on the second side of the tray system in which the plurality of slots are configured to receive the plurality of floor beams in the cargo area. Also, the apparatus may comprise a plurality of brackets configured to attach the plurality of segment trays to the plurality of floor beams. The plurality of brackets may be attached to a side of the plurality of floor beams. Also, the apparatus may comprise a plurality of walkways with scarfed transitions over the plurality of floor beams and fastened to plurality of floor beams.

In yet another advantageous embodiment, a method to increase a clearance of a cargo area of an aircraft is provided. A process locates a plurality of segment trays in a tray system between a plurality of floor beams located underneath a surface of the cargo area of the aircraft. Also, the process fastens the plurality of segment trays in the tray system to the plurality of floor beams.

In yet another advantageous embodiment, a method to increase a clearance of a cargo area of an aircraft may be provided. The process may begin by removing a floor of a surface of the cargo area exposing a plurality of floor beams. Then, the process may remove an existing tray system from the cargo area. Thereafter, the process may separate the existing tray system into a plurality of segment trays to form a tray system.

The process may also locate the plurality of segment trays in the tray system between the plurality of floor beams located underneath the surface of the cargo area of the aircraft. The tray system may have a plurality of rollers positioned partially above the plurality of floor beams. A first side of the tray system may be substantially flush with the surface of the floor in the cargo area. A portion of the tray system may extend into an area of a door of the cargo area.

The process may also connect the plurality of segment trays by interlocking the plurality of segment trays using interlocking pads that are anti-symmetrical. Additionally, the process may fasten the plurality of segment trays of the tray system to the plurality of floor beams using a plurality of brackets. Then, the process may fasten a plurality of walkways with scarfed transitions to the plurality of floor beams between the plurality of segment trays.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
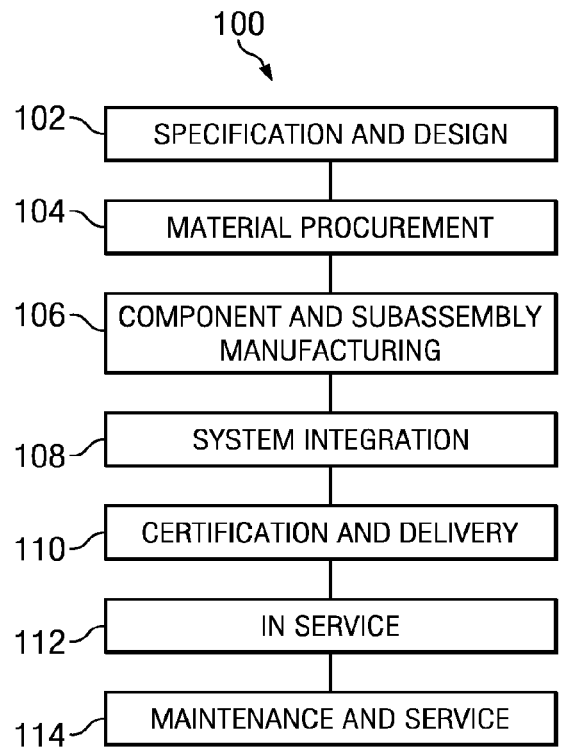
FIG. 1 is an illustration of an aircraft manufacturing and service method in accordance with an advantageous embodiment.

Referring more particularly to the drawings, embodiments of the disclosure may be described in the context of aircraft manufacturing and service method 100 as shown in FIG. 1. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

Figure 2:
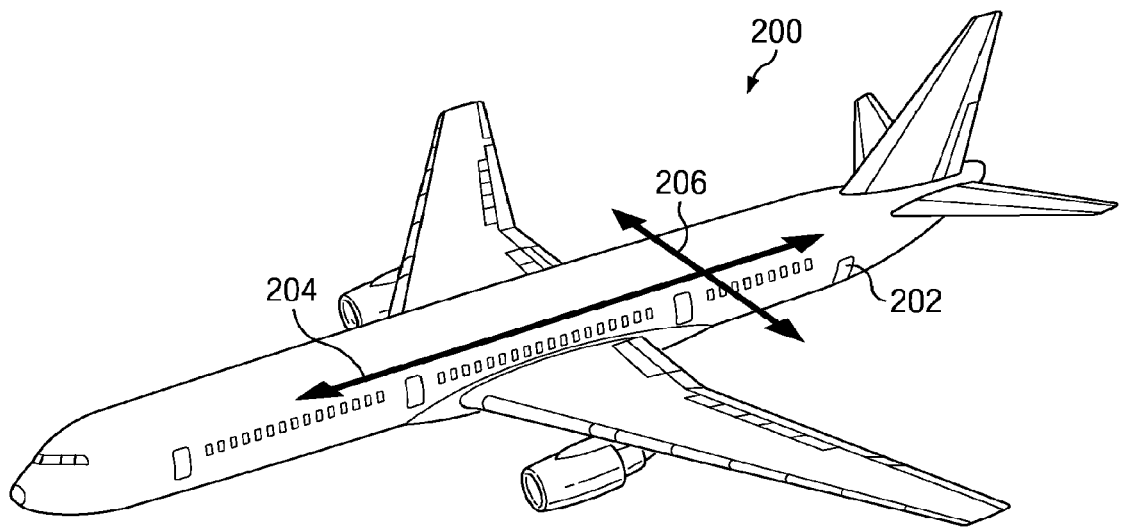
FIG. 2 is an illustration of an aircraft depicted in accordance with an advantageous embodiment.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

With reference now to FIG. 2, an illustration of an aircraft is depicted in accordance with an advantageous embodiment. In this illustrative example, aircraft 200 may include door 202. Door 202 may be positioned in other locations on aircraft 200 than depicted in FIG. 2. Door 202 may give entry to a cargo area, passenger cabin, cockpit, or other area of aircraft 200.

Axis 204 may be an axis located axially through the length of aircraft 200 which may be positioned through the nose and the tail of aircraft 200. Axis 204 may also be known as a longitudinal direction. Axis 206 may be an axis perpendicular to axis 204. Axis 206 may also be known as a lateral direction or transverse direction.

The different advantageous embodiments recognize and take into account a number of different considerations. For example, without limitation, the different advantageous embodiments recognize and take into account that current cargo handling systems may use trays that are located above a floor surface. Trays above the floor may reduce the height and volume available for cargo. Cargo containers may be restricted in height. Cargo handling systems may be lower deck cargo handling systems on commercial aircraft and military transports. Additionally, cargo handling systems may be cargo handling systems on aircraft with a passenger cabin and cargo deck, aircraft with only cargo decks, or aircraft with combination decks.

The different advantageous embodiments recognize and take into account that lower deck cargo must normally be loaded and unloaded very quickly to minimize the time that the aircraft may be held on the ground. Existing lower deck cargo handling systems mount cargo rollers in trays on top of the cargo floor, reducing the height and volume available for cargo. Standard lower deck cargo containers, such as the LD-3, are restricted in height because of this. Some existing commercial lower deck cargo handling systems allow the loading of non-standard cargo containers or special equipment, but require significant additional loading and unloading time.

Some applications, such as fuselage mounted auxiliary fuel tanks, for military or commercial aircraft, may only be loaded or unloaded during maintenance. The fuselage mounted auxiliary fuel tanks increase the amount of fuel that can be carried, which can be used to increase the range of a commercial passenger or freighter aircraft or increase the amount of fuel that can be offloaded in the air or on the ground by a military tanker aircraft. Existing lower lobe cargo handling systems limit the height of the cargo to that of existing standard aircraft cargo containers like the LD-3.

The current lower deck cargo handling systems on commercial aircrafts and military transports incorporate several roller trays in a lower lobe cargo compartment, which may be oriented along the aircraft longitudinal axis. In addition, there may be several transverse trays with free rotating metal balls in a cargo doorway area. There may also be some service crew access floor panels in place with the roller trays system. Non-standard cargo units can be moved on this system of rollers, or they can be loaded on top of a pallet, which may be moved over the rollers in a similar way. All this existing lower deck cargo handling systems equipment may be located above the lower lobe cargo floor beams, using valuable space that could be used for cargo.

One of the currently considered ideas how to set the lower deck cargo handling system as low as possible to the floor beams may be to create an inverted system. In the inverted system, all rollers have to be replaced by a system of rails from the cargo door threshold over the whole cargo compartment. In the inverted system, the free-rotating balls may be moved to the bottom of the tool or pallet, and there may be no rollers attached to the static part of lower deck cargo handling system. The rails may be installed right above the floor beams, and their support structure may be located between floor beams/frames.

Proposed lower profile cargo deck handling systems may be a complete redesign compared to existing systems. The proposed concept may add weight and complexity, and may have precision assembly, where existing systems may not have high precision. The proposed concept may have special loading pallets, with the rolling elements attached to the lower surface, still using up valuable cargo height and volume. These special loading pallets would have to be transported to any cargo loading location that did not have a supply.

Thus, the different advantageous embodiments provide a method and apparatus to increase a clearance of a cargo area of an aircraft. The apparatus and method may comprise an aircraft with a cargo area. A tray system may have a plurality of segment trays with each segment tray positioned between a plurality of floor beams located underneath a surface of the cargo area. A roller system in the tray system may be configured to allow an object to be moved across the cargo area.

A first component may be considered to be associated with a second component by being secured to the second component, bonded to the second component, fastened to the second component, and/or connected to the second component in some other suitable manner. The first component may also be connected to the second component using a third component. The first component may also be considered to be associated with the second component by being formed as part of, and/or an extension of, the second component.

Figure 3:
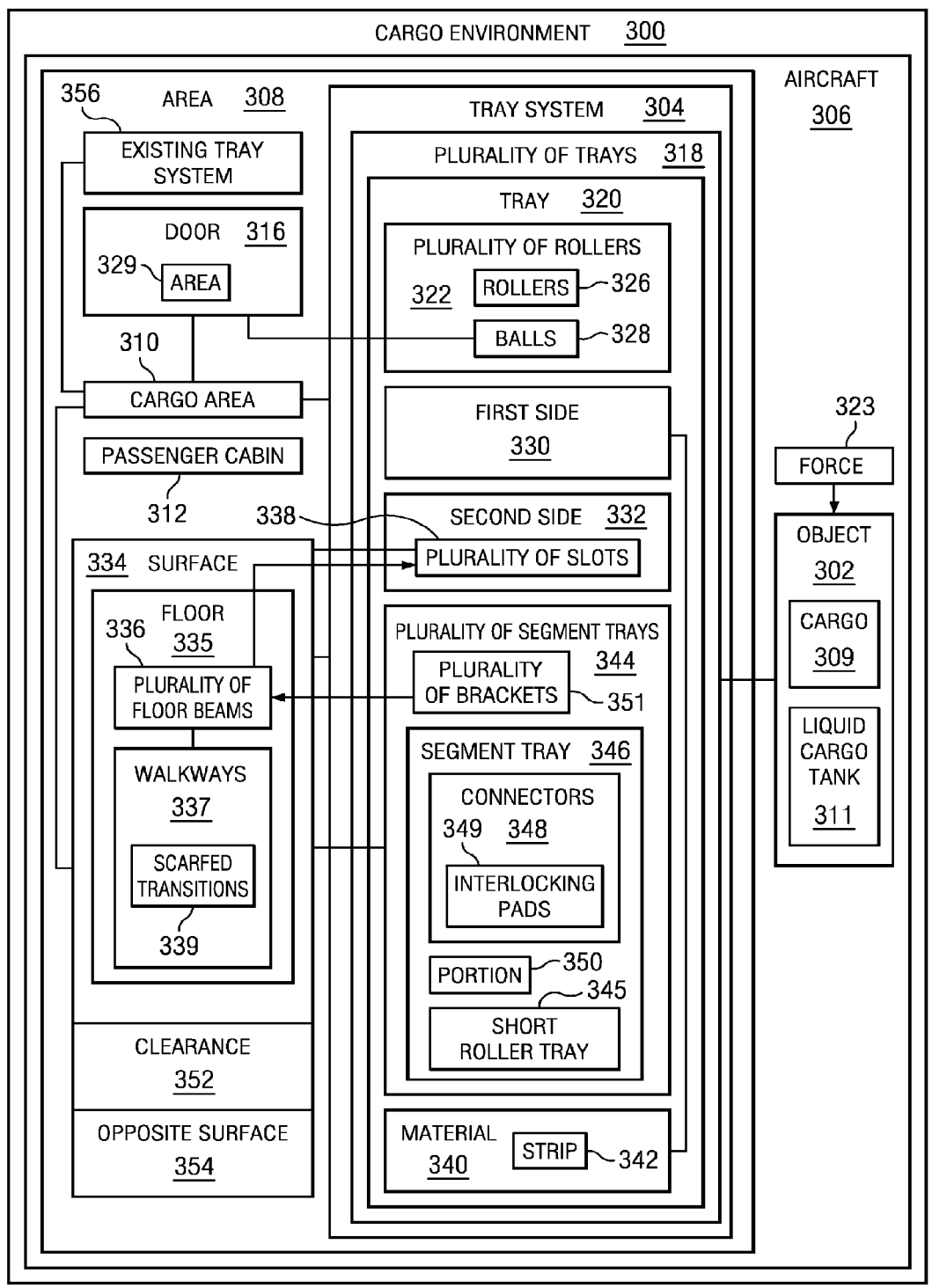
FIG. 3 is an illustration of a block diagram of a cargo environment depicted in accordance with an advantageous embodiment.

With reference now to FIG. 3, an illustration of a block diagram of a cargo environment is depicted in accordance with an advantageous embodiment. In this illustrative example, aircraft 200 in FIG. 2 may be part of cargo environment 300.

In this illustrative example, cargo environment 300 may be used to manage object 302 using tray system 304 inside of aircraft 306. Aircraft 306 may be one example of one implementation of aircraft 200 in FIG. 2. Cargo environment 300 may include area 308 and object 302. Cargo environment 300 may be used to manage object 302 within area 308 of aircraft 306. Object 302 may be an item that is to be loaded into area 308. Object 302 may be for example, cargo 309, a vehicle, aircraft 306, a truck, a pallet, liquid cargo tank 311 and/or any other suitable object to be transported in area 308.

Area 308 may be any area in aircraft 306. In this illustrative example, area 308 may be cargo area 310. In these illustrative examples, cargo area 310 may be an aircraft lower lobe cargo area, main deck cargo area, and other suitable areas where cargo may be used. In freighter aircraft, the main deck cargo area may be where the passenger cabin in commercial aircraft is located. In other illustrative examples, area 308 may be in other spaces in aircraft 306, such as, but not limited to, passenger cabin 312. Area 308 may comprise tray system 304 and door 316. Door 316 may be the door to cargo area 310 of aircraft 306. Door 316 may be one example of one implementation of door 202 in FIG. 2.

Tray system 304 may be a system of trays and rollers which receive objects, such as object 302. Object 302 may be moved around area 308 using tray system 304. Tray system 304 may comprise plurality of trays 318. Each tray 320 in plurality of trays 318 may be associated with plurality of rollers 322.

Plurality of rollers 322 may be configured to allow object 302 to move across tray 320 when force 323 is applied to object 302. Plurality of rollers 322 may be positioned within tray 320. Plurality of rollers 322 may comprise rollers 326, balls 328, or a combination thereof. Rollers 326 may be rollers that rotate around an axis, allowing object 302 to move in a direction, such as a direction along axis 204 in FIG. 2. Balls 328 may rotate around any axis, allowing object 302 to move across in any direction.

Balls 328 may be positioned near door 316. In different advantageous embodiments, balls 328 may be positioned in other locations of area 308. Positioning balls 328 near door 316 may allow object 302 to be moved into area 308 coming from one direction, and then moved within area 308 in another direction, such as the direction of rollers 326. For example, object 302 may be moved in a direction along axis 206 as in FIG. 2 and then moved in a direction along axis 204 as in FIG. 2 down the length of aircraft 306.

In different advantageous embodiments, there may be more than one door 316. Area 329 may be near door 316. In these advantageous embodiments, area 329 may have the dimensions of the width of door 316 and a length that extends from door 316 across area 308 to a wall. In different advantageous embodiments, area 329 may have other suitable dimensions.

Tray system 304 may comprise first side 330 and second side 332. First side 330 may be substantially flush with surface 334 of floor 335 of area 308. First side 330 may be substantially level with surface 334. For example, first side 330 may have the same vertical elevation as surface 334. Plurality of rollers 322 may be positioned so that a portion of each roller may be above first side 330 and surface 334 allowing object 302 to interact with plurality of rollers 322.

Surface 334 may include plurality of floor beams 336. Plurality of floor beams 336 may be part of the structure of aircraft 306. Plurality of floor beams 336 may include floor beam caps. Floor beam caps may be on top of plurality of floor beams 336. When an item is bolted or fastened to the top of a floor beam of plurality of floor beams 336, the item may be bolted or fastened to the floor beam cap of that particular floor beam. Tray 320 may include plurality of slots 338 configured to receive plurality of floor beams 336 in area 308.

Surface 334 may also include walkways 337. Walkways 337 are walkways between and around tray system 304. Walkways 337 may have scarfed transitions 339. Scarfed transitions 339 are parts of walkways 337 that are less thick than other parts of walkways 337. Scarfed transitions 339 may be positioned over plurality of floor beams 336.

Plurality of slots 338 may be openings in tray 320 matching the shape of plurality of floor beams 336. Plurality of slots 338 allow tray 320 to be positioned substantially flush with surface 334 of floor 335. Tray 320 may be comprised of material 340. In these advantageous embodiments, material 340 may be metal. In different advantageous embodiments, material 340 may be plastic, composite, or some other suitable material. Strip 342 of tray 320 may be positioned across plurality of floor beams 336. Strip 342 may be a portion of tray 320.

Tray 320 may comprise plurality of segment trays 344. Each segment tray 346 may be positioned between plurality of floor beams 336. Portion 350 of each segment tray 346 may be connected to adjacent segment trays of plurality of segment trays 344. Plurality of segment trays 344 may be connected by strip 342. In different advantageous embodiments, plurality of segment trays 344 may not be connected at all, but attached only between plurality of floor beams 336. When plurality of segment trays 344 do not connect with each other, plurality of slots 338 may be the space between plurality of segment trays 344 where plurality of floor beams 336 are located. Tray 320 may also comprise short roller tray 345. Short roller tray 345 may be near area 329. Short roller tray 345 may be used in other locations in area 308. Short roller tray 345 may be a shorter tray with rollers 326 and balls 328.

Plurality of segment trays 344 may be connected to plurality of floor beams 336 using plurality of brackets 351. Plurality of brackets 351 may be used to bolt or fasten plurality of segment trays 344 to plurality of floor beams 336. In one or more advantageous embodiments, each segment tray 346 uses two brackets of plurality of brackets 351 to attach to two floor beams of plurality of floor beams 336.

Strip 342 of material 340 may be continuous or not continuous. When strip 342 is continuous, tray 320 may be positioned over plurality of floor beams 336 as a single piece. When strip 342 is not continuous, each segment tray 346 may be positioned over plurality of floor beams 336 separately. When positioning each segment tray 346 separately, connectors 348 that interlock are used to connect plurality of segment trays 344 with each other. In one or more advantageous embodiments, connectors 348 may be interlocking pads 349 that are anti-symmetrical.

The different advantageous embodiments may allow larger cargo or auxiliary fuel tanks. This height increase may allow oversized cargo to be carried or the increase of several hundreds of gallons of fuel with auxiliary fuel tanks. The increase in height of the cargo or auxiliary fuel tanks may be an increase in height over current cargo area systems. The different embodiments may also provide support for the plurality of floor beams.

Area 308 may have clearance 352. Clearance 352 may be the distance between surface 334 and opposite surface 354. Opposite surface 354 may be the wall across from surface 334. For example, surface 334 may be the floor of cargo area 310 and opposite surface 354 may be the ceiling of cargo area 310. The different advantageous embodiments may provide tray system 304 which has plurality of trays 318 substantially flush or flush with surface 334 of floor 335. The positioning of plurality of trays 318 may provide a greater clearance 352 than existing tray systems.

In these illustrative examples, clearance 352 of area 308 may be increased with tray system 304 as opposed to existing tray system 356. Existing tray system 356 may be a tray system in place in aircraft 306 before tray system 304 may be implemented. Existing tray system 356 may be above surface 334 of area 308.

The illustration of cargo environment 300 in FIG. 3 is not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, area 308 may not be part of aircraft 306. In different advantageous embodiments, area 308 may be located in a warehouse or some other location. Additionally, surface 334 may be located in other positions of area 308 besides the floor.

Further, in some advantageous embodiments, tray system 304 may be used with other structures. For example, tray system 304 may be used in a spacecraft, a satellite, a submarine, a surface ship, an automobile, a tank, a truck, a power plant, an elevator system, and/or other suitable types of objects.

Figure 4:
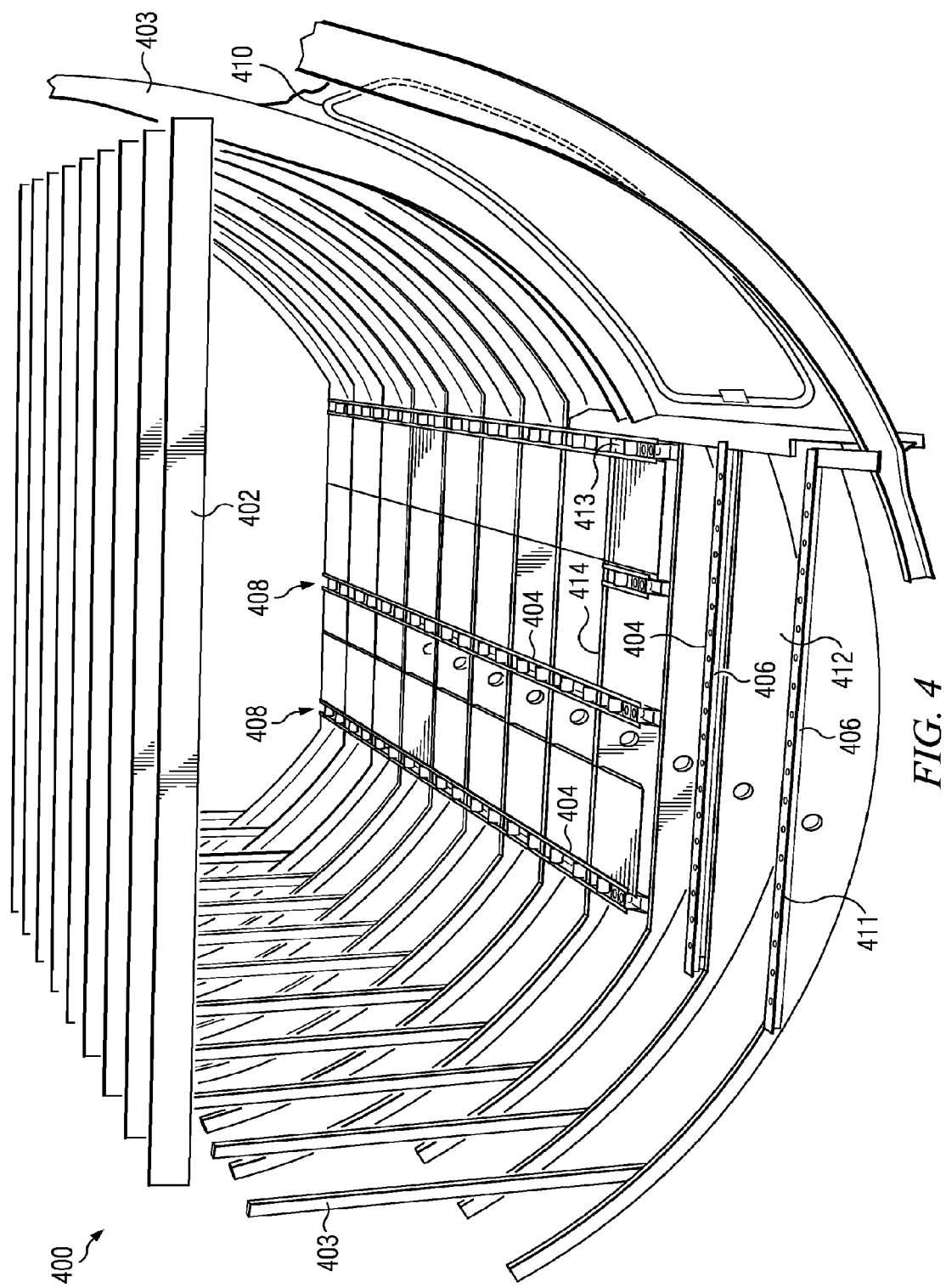
FIG. 4 is an illustration of a cargo area depicted in accordance with an advantageous embodiment.

With reference now to FIG. 4, an illustration of a cargo area is depicted in accordance with an advantageous embodiment. In this illustrative example, cargo area 400 may be an example of one implementation for cargo area 310 in FIG. 3. Cargo area 400 may be located below a passenger cabin. Cargo area 400 may be located within aircraft 200 in FIG. 2.

In this illustrative example, cargo area 400 may include main deck floor beams 402, frames 403, tray system 404, lateral trays 406, and longitudinal trays 408, door opening 410, floor beams 412, and surface 414. Tray system 404 may include trays for housing rollers. Tray system 404 may be an example of one implementation for tray system 304 in FIG. 3. Tray system 404 includes both lateral trays 406 and longitudinal trays 408. Lateral trays 406 may be located near door opening 410. Door opening 410 may be one example of one implantation of door 316 in FIG. 3.

In this illustrative example, lateral trays 406 may be configured to receive an object from the direction of door opening 410. Lateral trays 406 may also be configured to allow the object to move across balls 411 in lateral trays 406 in a direction, such as a direction along axis 206 as shown in FIG. 2, along longitudinal trays 408.

In this illustrative example, longitudinal trays 408 may be configured to receive an object from the direction of lateral trays 406. Longitudinal trays 408 may include both balls 411 and rollers 413.

Tray system 404 may be associated with floor beams 412. One side of each tray of tray system 404 may be substantially flush with surface 414 of floor beams 412. In this illustrative example, a portion of balls 411 and rollers 413 in lateral trays 406 and longitudinal trays 408 may be above surface 414 of floor beams 412.

Figure 5:
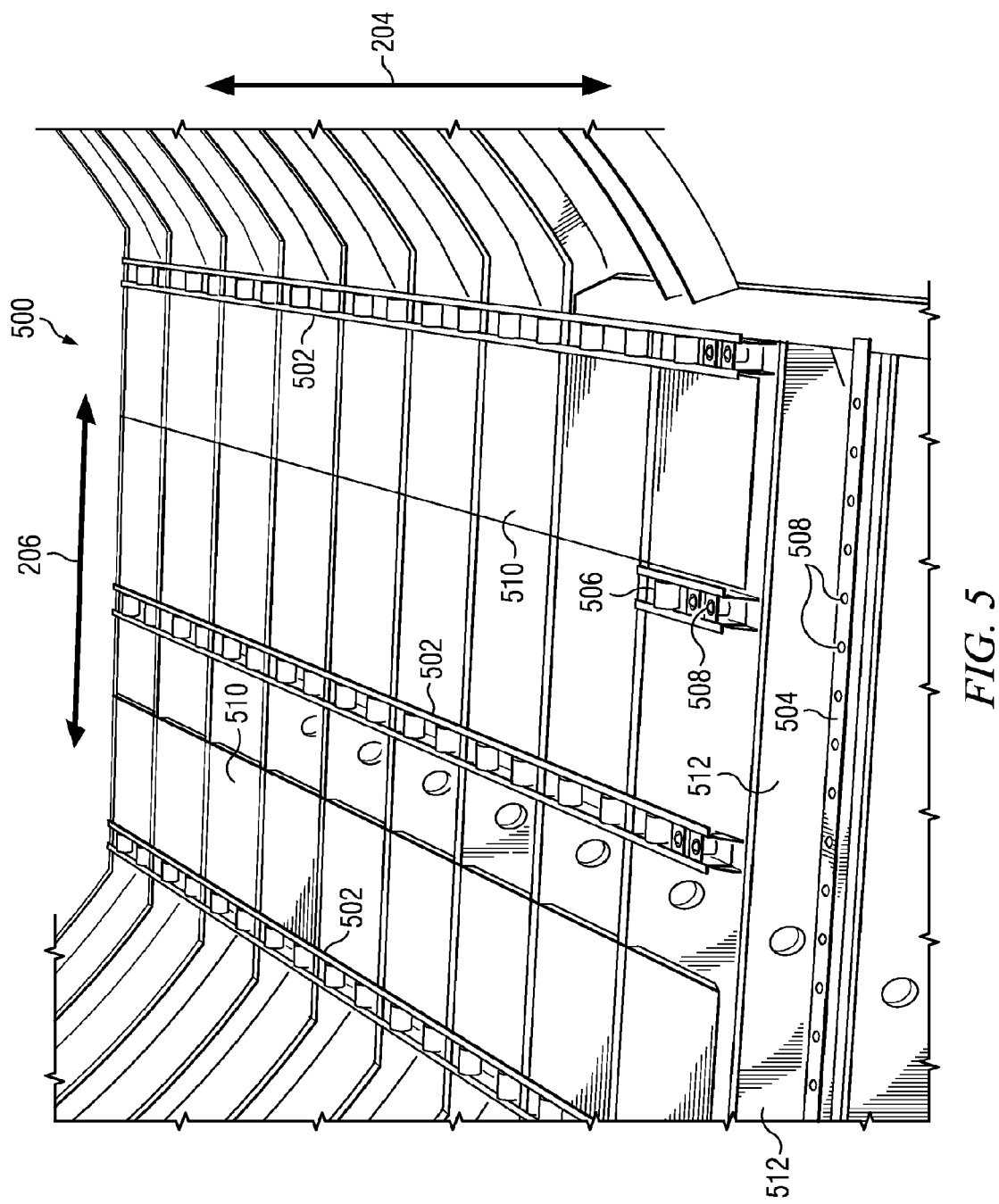
FIG. 5 is an illustration of a tray system depicted in accordance with an advantageous embodiment.

With reference now to FIG. 5, an illustration of a tray system is depicted in accordance with an advantageous embodiment. In this illustrative example, tray system 500 may be an example of one implementation for tray system 304 in FIG. 3.

In this illustrative example, tray system 500 may include longitudinal trays 502, lateral trays 504, rollers 506, balls 508, and floor panels 510. Tray system 500 may be associated with floor beams 512. Tray system 500 may allow for the movement of objects throughout an area.

In this illustrative example, longitudinal trays 502 may include rollers 506 and balls 508. In different advantageous embodiments, longitudinal trays 502 may include other types of rollers, all rollers of one kind, or no rollers. Rollers 506 on longitudinal trays 502 may be positioned near a door to the area.

In this illustrative example, lateral trays 504 may be substantially perpendicular to longitudinal trays 502. Lateral trays 504 may include different types of rollers, all rollers of one kind, or no rollers.

Figure 6:
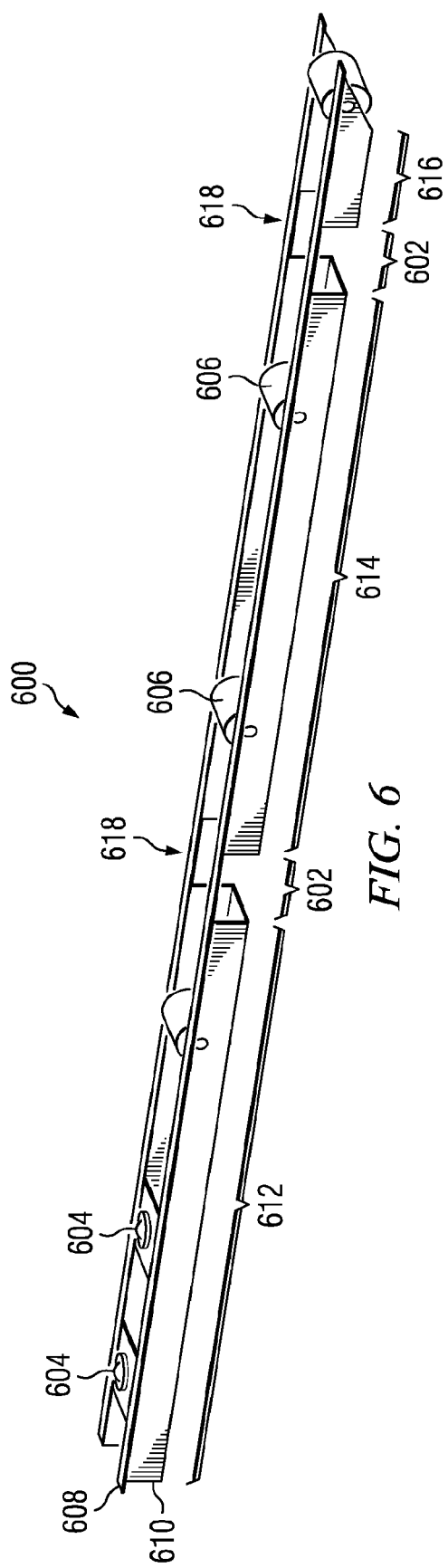
FIG. 6 is an illustration of a tray depicted in accordance with an advantageous embodiment.

With reference now to FIG. 6, an illustration of a tray is depicted in accordance with an advantageous embodiment. In this illustrative example, tray 600 may be an example of one implementation for tray 320 in FIG. 3.

In this illustrative example, tray 600 may be one of a plurality of trays located in an area of an aircraft. Tray 600 allows for the movement of objects across the area. Tray 600 may include slots 602, balls 604, and rollers 606. Slots 602 may be an example of one implementation of plurality of slots 338 in FIG. 3.

Slots 602 may be configured to receive floor beams and other structures beneath a floor of an area in an aircraft. Slots 602 may be in other shapes and configurations than those depicted in FIG. 6. First side 608 may be configured to stay substantially flush with a surface of a floor of an area. Second side 610 may include slots 602. Slots 602 may separate tray 600 into a plurality of segment trays, such as segment trays 612, 614, and 616. Segment trays 612, 614, and 616 may be an example of one implementation of plurality of segment trays 344 in FIG. 3. Each segment tray 612, 614, and 616 may be connected by portions 618 of each segment tray 612, 614, and 616 that extend across slots 602.

Figure 7:
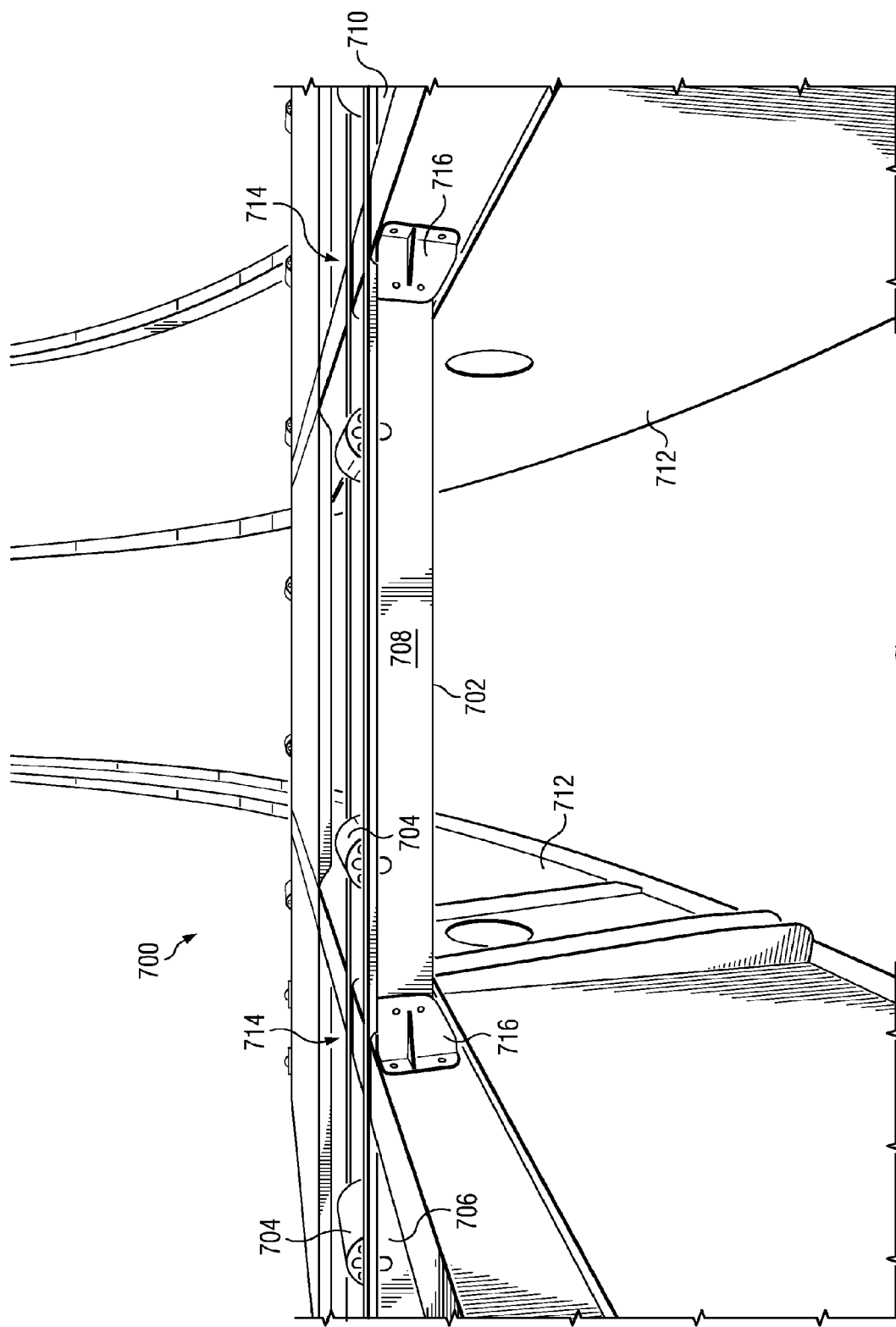
FIG. 7 is an illustration of a tray system depicted in accordance with an advantageous embodiment.

With reference now to FIG. 7, an illustration of a tray system is depicted in accordance with an advantageous embodiment. In this illustrative example, tray system 700 may be an example of another implementation for tray system 304 in FIG. 3.

In this illustrative example, tray system 700 may include tray 702. Tray 702 may be an example of one implementation of tray 320 in FIG. 3. Tray 702 may include rollers 704. Rollers 704 may be positioned partially above tray 702 so that an object may move across them and utilize the rotational features of rollers 704 when moving.

Tray 702 may include segment trays 706, 708, and 710. Floor beams 712 may separate segment trays 706, 708, and 710. Each segment tray 706, 708, and 710 may also be connected to adjacent segment trays by portions 714 of each segment tray 706, 708, and 710. Brackets 716 may secure each segment tray to floor beams 712. In different advantageous embodiments, more or less brackets 716 may be used than those depicted in FIG. 7.

Figure 8:
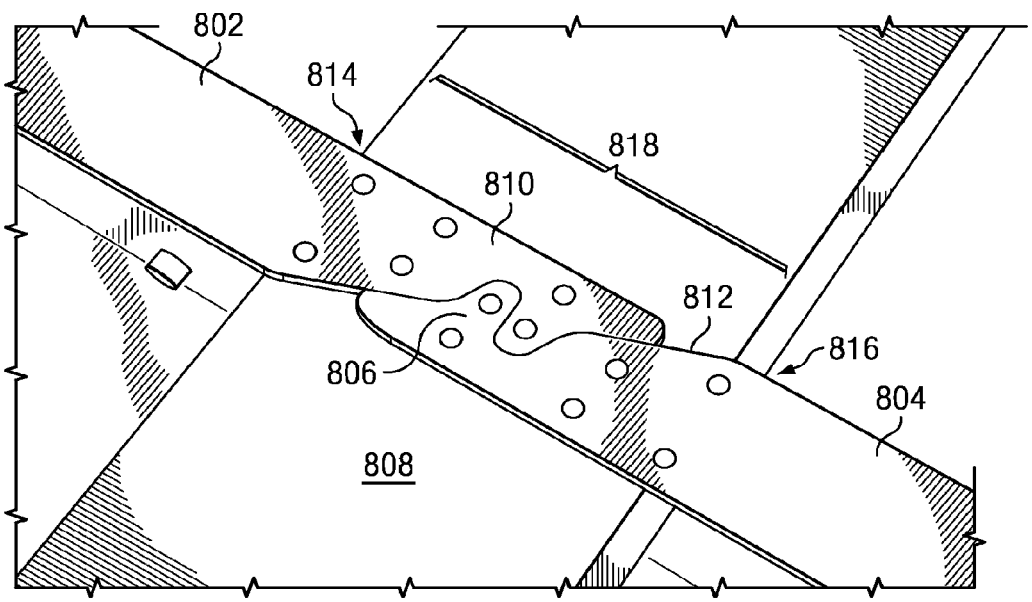
FIG. 8 is an illustration of segment trays of a tray depicted in accordance with an advantageous embodiment.

With reference now to FIG. 8, an illustration of segment trays of a tray is depicted in accordance with an advantageous embodiment. In this illustrative example, segment trays 802 and 804 may be an example of one implementation for plurality of segment trays 344 in FIG. 3. Segment trays 802 and 804 may be adjacent.

In this illustrative example, segment trays 802 and 804 may be connected by interlocks 806. Segment trays 802 and 804 may be connected across floor beams 808. Interlocks 806 may be different shapes, sizes, and configurations.

Interlocks 806 may comprise interlock 810 and interlock 812. Interlock 810 may be located at end 814 of segment tray 802. Interlock 812 may be located at end 816 of segment tray 804. Interlock 810 and interlock 812 may be configured to hook into each other. In different advantageous embodiments, interlock 810 and interlock 812 may latch into each other. Interlocks 806 may also be referred to as short straps or straps. Interlocks 806 may cover more than 50% of width 818 of floor beams 808.

Figure 9:
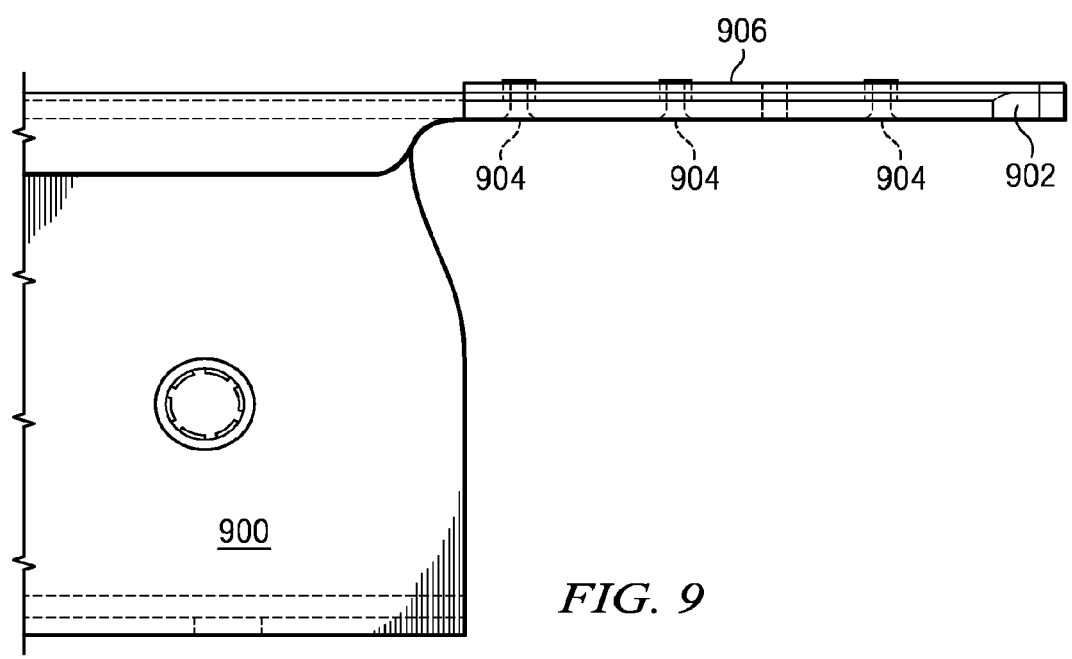
FIG. 9 is an illustration of a segment tray with a slot in accordance with an advantageous embodiment.

Turning now to FIG. 9, an illustration of a segment tray with a slot is depicted in accordance with an advantageous embodiment. Segment tray 900 may be an example of one implementation of segment tray 346 in FIG. 3. Segment tray 900 may comprise strip 902. Strip 902 extends from segment tray 900. Strip 902 may include interlocks, such as interlocks 806 in FIG. 8. Strip 902 with interlocks provides positioning of the adjacent segment trays for installation, a secondary longitudinal load path to prevent floor beams from twisting, and the segment tray can be fastened to the floor beams. Additionally, strip 902 may have rivets 904 to rivet pad 906 to strip 902.

Figure 10:
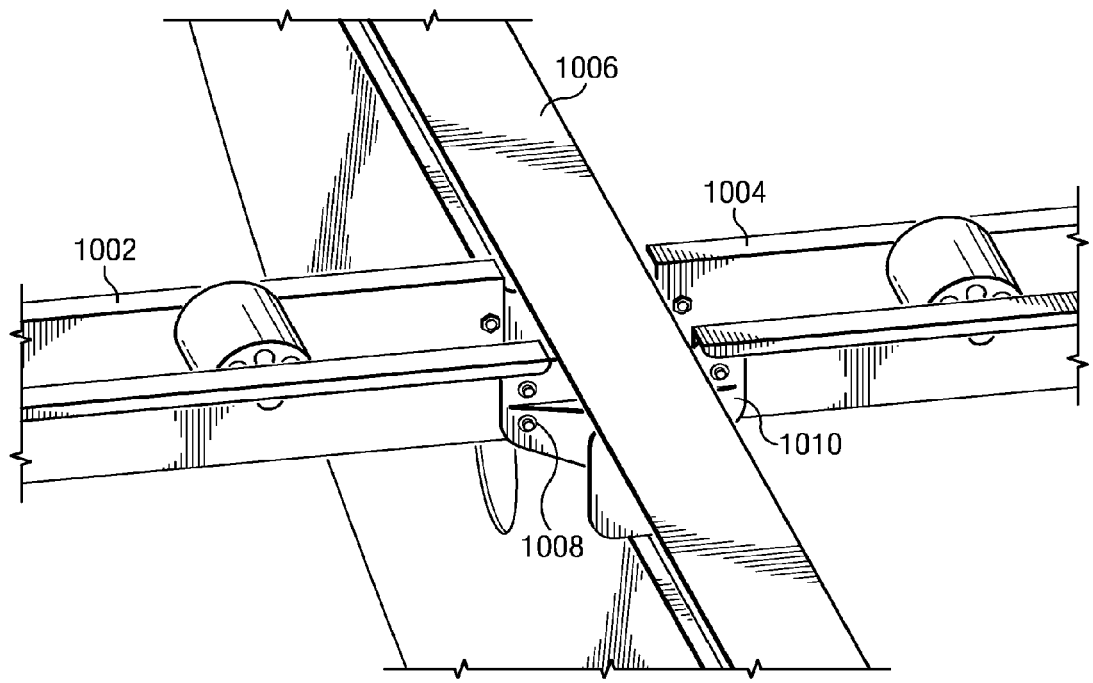
FIG. 10 is an illustration of segment trays of a tray depicted in accordance with an advantageous embodiment.

With reference now to FIG. 10, an illustration of segment trays of a tray is depicted in accordance with an advantageous embodiment. In this illustrative example, segment trays 1002 and 1004 may be an example of another implementation for plurality of segment trays 344 in FIG. 3.

In this illustrative example, segment trays 1002 and 1004 may not be connected. Segment trays 1002 and 1004 may be secured to floor beam 1006 with brackets 1008 and 1010, respectively. Segment trays 1002 and 1004 may be secured in other ways, such as, for example, being welded directly to floor beam 1006. In this illustrative example, no part of segment trays 1002 and 1004 goes across floor beam 1006. However, in different illustrative embodiments, pads or some other material may be placed across floor beam 1006.

Figure 11:
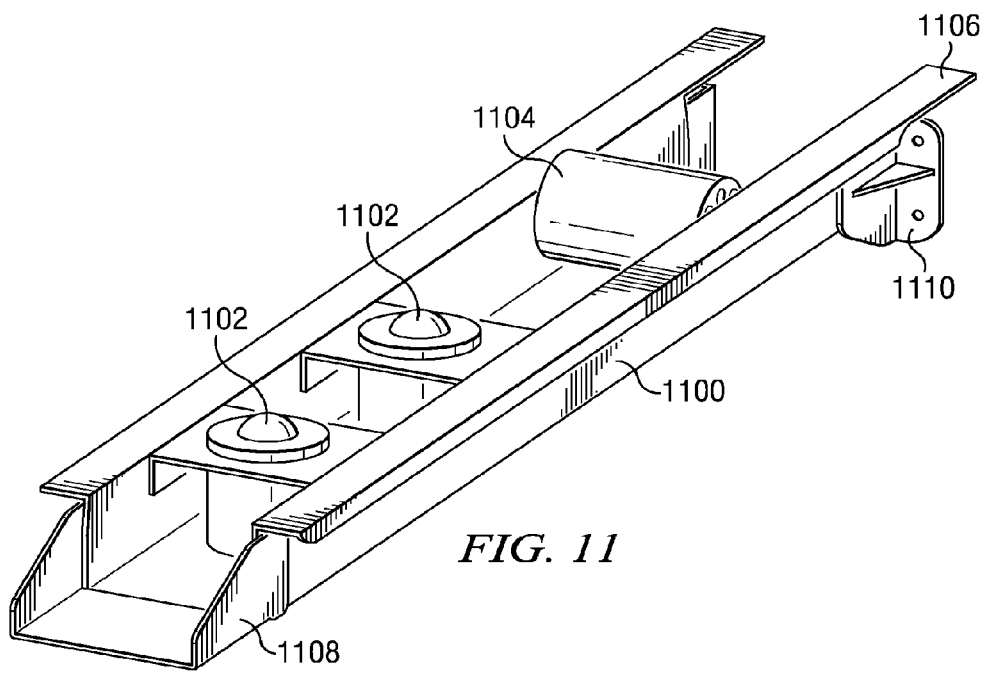
FIG. 11 is an illustration of a segment tray of a tray depicted in accordance with an advantageous embodiment.

With reference now to FIG. 11, an illustration of a segment tray of a tray is depicted in accordance with an advantageous embodiment. In this illustrative example, segment tray 1100 may be an example of one implementation for segment tray 346 in FIG. 3.

In this illustrative example, segment tray 1100 may be a segment tray of a plurality of segment trays of a tray. Segment tray 1100 may include both balls 1102 and rollers 1104. In different advantageous embodiments, other rollers and combinations of rollers may be used.

Segment tray 1100 may include portion 1106 of segment tray 1100 that connects to another adjacent segment tray. Portion 1106 may be located where a slot may be used to receive a floor beam. In different advantageous embodiments, portion 1106 may be positioned in other areas of segment tray 1100, such as the opposite side.

Segment tray 1100 may include brackets 1108 and 1110. Bracket 1108 may be different from bracket 1110. Brackets 1108 and 1110 may be positioned on the ends of segment tray 1100. Brackets 1108 and 1110 may be configured to secure segment tray 1100 to floor beams.

Figure 12:
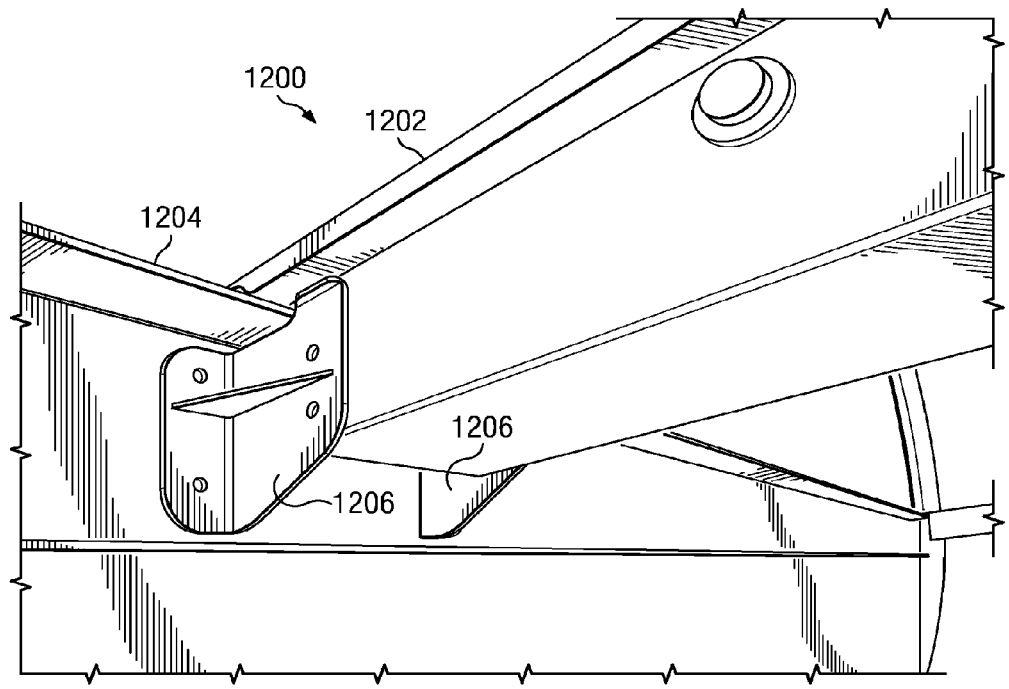
FIG. 12 is an illustration of a tray and floor beam interface depicted in accordance with an advantageous embodiment.

With reference now to FIG. 12, an illustration of a tray and floor beam interface is depicted in accordance with an advantageous embodiment. In this illustrative example, interface 1200 may be an example of one implementation for an interface of plurality of floor beams 336 and tray 320 in FIG. 3.

In this illustrative example, tray 1202 may be secured to floor beam 1204 by brackets 1206. The placement, shape, and design of brackets 1206 may be just one example of one implementation of brackets that may be used to secure tray 1202 to floor beam 1204.

Figure 13:
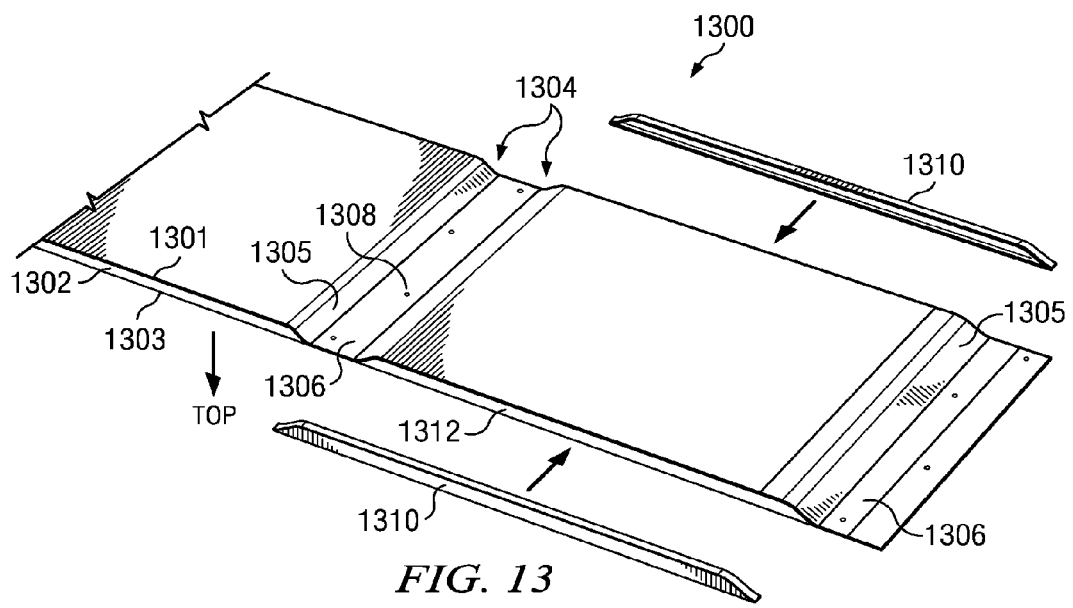
FIG. 13 is an illustration of a bottom view of a floor panel in accordance with an advantageous embodiment.

Turning to FIG. 13, an illustration of a bottom view of a floor panel is depicted in accordance with an advantageous embodiment. Floor panel 1300 may be one example of one implementation of floor panel 510 in FIG. 5.

Floor panel 1300 may include lower skin 1301, core 1302, and upper skin 1303. Floor panel 1300 may be machined through core 1302 up to lower skin 1301 to create scarfed slot 1304 at all places where floor panel 1300 will meet the floor beam. A number of lamina plies 1305 may be co-cured to seal off the trimmed core. Plies may be added to the area which faces the floor beams 1306. Holes 1308 may be for panel-to-floor beam cap attachments. Side caps 1310 may seal the remaining panel core segment trays 1312. Side caps 1310 and panel core segment trays 1312 may be co-cured or co-bonded.

Figure 14:
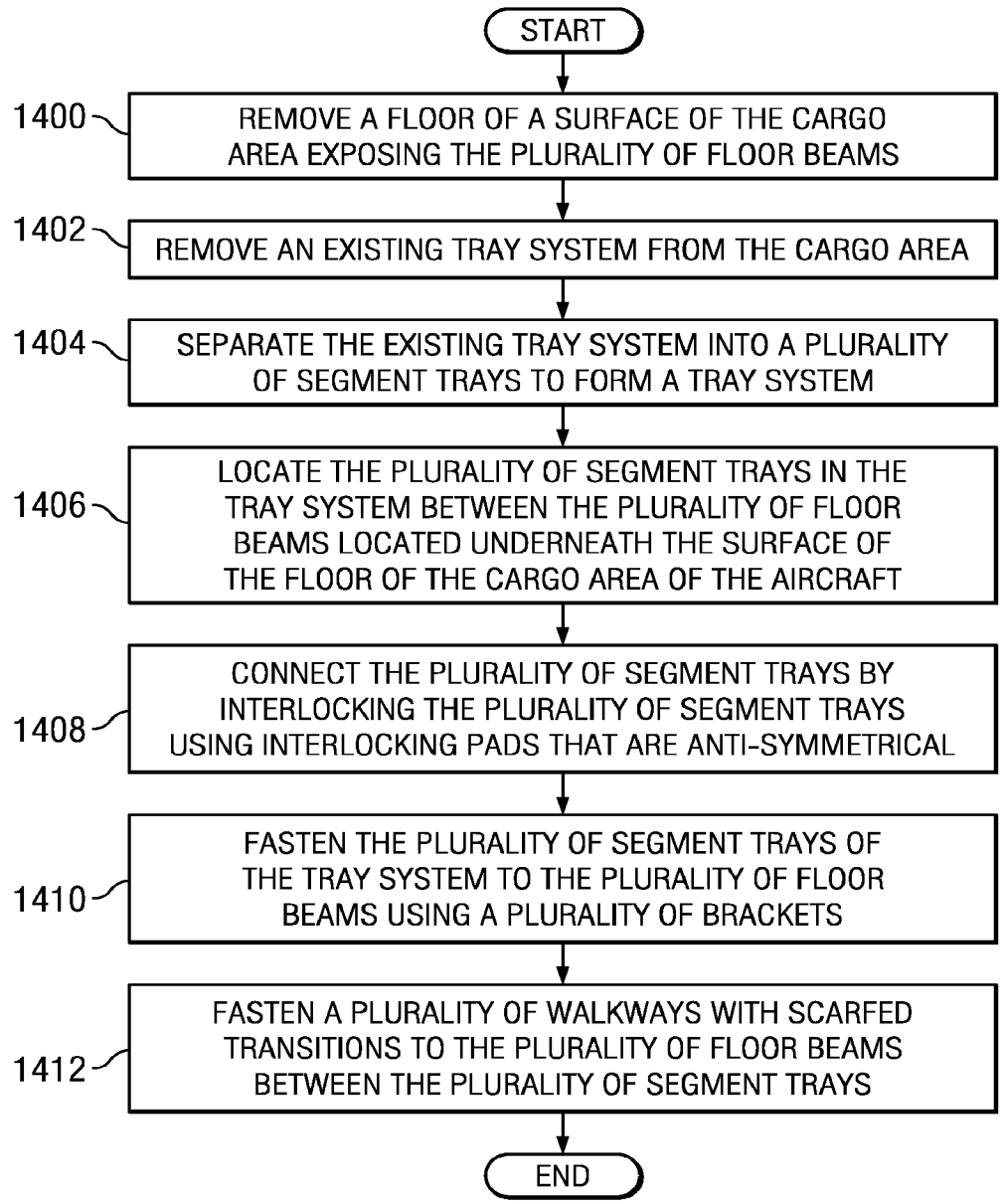
FIG. 14 is an illustration of a flowchart of a process to increase a clearance of a cargo area of an aircraft depicted in accordance with an advantageous embodiment.

With reference now to FIG. 14, an illustration of a flowchart of a process to increase a clearance of a cargo area of an aircraft is depicted in accordance with an advantageous embodiment. The process illustrated in FIG. 14 may be implemented using tray system 304 in FIG. 3.

The process may begin by removing a floor 335 of a surface 334 of the cargo area 310 exposing the plurality of floor beams 336 (operation 1400). Then, the process may remove an existing tray system 356 from the cargo area 310 (operation 1402). Thereafter, the process may separate the existing tray system 356 into a plurality of segment trays 344 to form a tray system 304 (operation 1404).

The process may also locate the plurality of segment trays 344 in the tray system 304 between the plurality of floor beams 336 located underneath the surface 334 of the floor 335 of the cargo area 310 of the aircraft 306 (operation 1406). The tray system 304 may have a plurality of rollers 322 positioned partially above the plurality of floor beams 336. A first side 330 of the tray system may be substantially flush with the surface 334 of the floor 335 in the cargo area 310. A portion of the tray system 304 may extend into an area 329 of a door 316 of the cargo area 310.

The process may also connect the plurality of segment trays 344 by interlocking the plurality of segment trays 344 using interlocking pads 349 that are anti-symmetrical (operation 1408). Additionally, the process may fasten the plurality of segment trays 344 of the tray system 304 to the plurality of floor beams 336 using a plurality of brackets 351 (operation 1410). Then, the process may fasten a plurality of walkways 337 with scarfed transitions 339 to the plurality of floor beams 336 between the plurality of segment trays 344 (operation 1412).

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment tray, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus to increase a clearance of a cargo area of an aircraft. The apparatus and method may comprise an aircraft with a cargo area. A tray system may have a plurality of segment trays with each segment tray positioned between a plurality of floor beams located underneath a surface of the cargo area. A roller system in the tray system may be configured to allow an object to be moved across the cargo area.

The different advantageous embodiments may provide an inexpensive, lightweight, and simple way to install cargo-handling system. Additionally, the different advantageous embodiments provide an increase in height of the cargo or auxiliary fuel tanks by about 2 inches or about 3 inches. This height may allow oversize cargo to be carried or the increase of several hundreds of gallons of fuel. The increase in height of the cargo or auxiliary fuel tanks may be an increase in height over current cargo area systems. Additionally, the different advantageous embodiments provide support for the floor and floor beams in the area.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method to increase a clearance of a cargo area of an aircraft, the method comprising:
   removing an existing tray system from the cargo area;
   locating a plurality of segment trays in a modified tray system between a plurality of floor beams located underneath a surface of the cargo area of the aircraft, the modified tray system having a plurality of rollers positioned partially above the plurality of floor beams, a first side of the modified tray system is substantially flush with the surface of the cargo area, and a portion of the modified tray system extends into an area of a door of the cargo area;
   fastening the plurality of segment trays of the modified tray system to the plurality of floor beams; and
   fastening a plurality of walkways to the plurality of floor beams between the plurality of segment trays;
   wherein the plurality of segment trays are interlocked by interlocking pads that are anti-symmetrical so as to form the modified tray system.

2. The method of claim 1 further comprising removing the surface of the cargo area exposing the plurality of floor beams.

3. The method of claim 1 further comprising separating the existing tray system into a plurality of segment trays to form the modified tray system.

4. The method of claim 3 further comprising connecting the plurality of segment trays by interlocking the plurality of segment trays using the interlocking pads that are anti-symmetrical so as to form the modified tray system.

5. The method of claim 1, wherein the step of fastening the plurality of walkways to the plurality of floor beams comprises fastening the plurality of walkways having scarfed transitions to the plurality of floor beams between the plurality of segment trays.

6. The method of claim 1, wherein the step of fastening the plurality of segment trays of the modified tray system to the plurality of floor beams includes using a plurality of brackets.

7. The method of claim 1, wherein the plurality of segment trays are connected with a strip of material so that the plurality of segment trays form a beam that is a piece of material that is continuous.

8. A method for moving cargo with respect to a vehicle, the method comprising:
moving the cargo within a cargo area of the vehicle over a tray system including a plurality of segment trays positioned between a plurality of floor beams located underneath a surface of the cargo area of the vehicle, a first side of the tray system is substantially flush with the surface of the cargo area, and a portion of the tray system extends into an area of a door of the cargo area; and
moving the cargo on at least one device connected to the vehicle, the at least one device selected from the group consisting of a first set of balls, a second set of rollers, and a third set of balls and rollers, and at least a portion of the at least one device positioned partially above the plurality of floor beams and located below the surface of the cargo area of the vehicle;
wherein the plurality of segment trays are interlocked by interlocking pads that are anti-symmetrical so as to form the tray system.

9. The method of claim 8, wherein the at least one device is part of the plurality of segment trays, the plurality of segment trays comprising a second device selected from the group consisting of a longitudinal tray, a lateral tray, and a combination of longitudinal and lateral trays, and wherein longitudinal and lateral are determined with respect to an axis of the vehicle, and wherein longitudinal is perpendicular to lateral.

10. The method of claim 8, wherein the plurality of segment trays of the tray system are fastened to the plurality of floor beams with a plurality of brackets.

11. The method of claim 9, wherein the second device comprises the combination of longitudinal and lateral trays, including a first longitudinal tray and a first lateral tray, wherein the first longitudinal tray is configured to receive the cargo from a direction of the first lateral tray, and wherein moving the cargo further comprises moving the cargo from the first lateral tray to the first longitudinal tray.

12. The method of claim 8, wherein the at least one device is substantially flush to the surface and wherein moving further comprises moving the cargo about flush to the surface.

13. The method of claim 12, wherein a second device is substantially flush to the surface and wherein moving further comprises moving the cargo about flush to the surface.

14. The method of claim 8, wherein the vehicle comprises an aircraft.

15. The method of claim 8, wherein moving the cargo further comprises moving on the at least one device in a direction selected from the group consisting of longitudinally, laterally, and a combination of longitudinally and laterally, wherein longitudinal and lateral are determined with respect to an axis of the vehicle, and wherein longitudinal is about perpendicular to lateral.

16. The method of claim 15, wherein the direction comprises the combination of longitudinally and laterally.

17. The method of claim 8, wherein the device is located in the cargo area of the vehicle, wherein moving the cargo comprises moving oversized cargo at least partially in the cargo area, and wherein oversized comprises a size that fits in the cargo area only because at least the portion of the device is located below the surface of the cargo area of the vehicle.

18. The method of claim 8, wherein the at least one device is connected to the plurality of segment trays.

19. The method of claim 8, wherein the plurality of segment trays are connected with a strip of material so that the plurality of segment trays form a beam that is a piece of material that is continuous.

20. A method for moving cargo with respect to a vehicle, the method comprising:
moving the cargo within a cargo area of the vehicle over a tray system including a plurality of segment trays positioned between a plurality of floor beams located underneath a surface of the cargo area of the vehicle, a first side of the tray system is substantially flush with the surface of the cargo area, and a portion of the tray system extends into an area of a door of the cargo area; and
moving the cargo on at least one device connected to the vehicle, the at least one device selected from the group consisting of a first set of balls, a second set of rollers, and a third set of balls and rollers, and at least a portion of the at least one device positioned partially above the plurality of floor beams and located below the surface of the cargo area of the vehicle;
wherein the plurality of segment trays are connected with a strip of material so that the plurality of segment trays form a beam that is a piece of material that is continuous.

21. A method for moving cargo with respect to a vehicle, the method comprising:
moving the cargo within a cargo area of the vehicle over a tray system including a plurality of segment trays positioned between a plurality of floor beams located underneath a surface of the cargo area of the vehicle, a first side of the tray system is substantially flush with the surface of the cargo area, and a portion of the tray system extends into an area of a door of the cargo area; and
moving the cargo on at least one device connected to the vehicle, the at least one device selected from the group consisting of a first set of balls, a second set of rollers, and a third set of balls and rollers, and at least a portion of the at least one device positioned partially above the plurality of floor beams and located below the surface of the cargo area of the vehicle;
wherein the at least one device is part of the plurality of segment trays, the plurality of segment trays comprising a second device selected from the group consisting of a longitudinal tray, a lateral tray, and a combination of longitudinal and lateral trays, and wherein longitudinal and lateral are determined with respect to an axis of the vehicle, and wherein longitudinal is perpendicular to lateral; and wherein the plurality of segment trays of the tray system are fastened to the plurality of floor beams with a plurality of brackets.

\* \* \* \* \*

UNITED STATES PATENT AND TRADEMARK OFFICE
CERTIFICATE OF CORRECTION

PATENT NO.        : 9,738,372 B2
APPLICATION NO.   : 14/594120
DATED             : August 22, 2017
INVENTOR(S)       : Sergey D. Barmichev, Harry Wilbert Slusher and Gary Peter Seagrave It is certified that error appears in the above-identified patent and that said Letters Patent is hereby corrected as shown below:

In the Claims

Column 12, Line 59, delete "and"
Column 12, Line 62, after "trays;" add --and--
Column 13, Line 2, change "a" to --the--
Column 13, Line 30, delete "and"
Column 13, Line 32, change "the" second occurrence to --a--
Column 13, Line 37, after "vehicle;" add --and--
Column 14, Line 3, change "the" to --a--
Column 14, Line 10, change "the device" to --the at least one device--
Column 14, Line 33, delete "and"
Column 14, Line 36, change "the" second occurrence to --a--
Column 14, Line 41, after "vehicle;" add --and--
Column 14, Line 55, delete "and"
Column 14, Line 57, change "the" second occurrence to --a--

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*